United States Patent [19]

Takahashi et al.

[11] Patent Number: 5,342,879

[45] Date of Patent: Aug. 30, 1994

[54] FLUOROSILICONE RUBBER COMPOSITION

[75] Inventors: Masaharu Takahashi; Ken-ichi Takita; Shinichi Sato, all of Annaka, Japan

[73] Assignee: Shin-Etsu Chemical Co., Ltd., Tokyo, Japan

[21] Appl. No.: 2,065

[22] Filed: Jan. 8, 1993

[30] Foreign Application Priority Data

Jan. 10, 1992 [JP] Japan .................................. 4-021892

[51] Int. Cl.$^5$ ............................................ C08L 83/00
[52] U.S. Cl. ................................ 524/588; 525/477; 528/42
[58] Field of Search ...................... 524/588; 525/477; 528/42

[56] References Cited

U.S. PATENT DOCUMENTS

| | | | |
|---|---|---|---|
| 3,847,961 | 11/1974 | Koshar | 528/42 |
| 4,525,528 | 6/1985 | Bush et al. | 524/860 |
| 4,985,526 | 1/1991 | Kishita et al. | 528/42 |
| 5,179,159 | 1/1993 | Kishita et al. | 524/863 |

FOREIGN PATENT DOCUMENTS 0311262 4/1989 European Pat. Off.
0458617 11/1991 European Pat. Off.

*Primary Examiner*—Melvyn I. Marquis
*Assistant Examiner*—Karen A. Dean
*Attorney, Agent, or Firm*—Oblon, Spivak, McClelland, Maier & Neustadt

[57] ABSTRACT

The present fluorosilicone rubber composition comprises a trifluoropropyl group-containing organopolysiloxane, a perfluoroalkyl group-containing organopolysiloxane, and a silica filler. This composition exhibits excellent resistance to any of nonpolar solvents, polar solvents, and fuel oils.

12 Claims, No Drawings

FLUOROSILICONE RUBBER COMPOSITION

BACKGROUND OF THE INVENTION

1. Field of the Invention

The present invention relates to a fluorosilicone rubber composition low in swellability in various solvents and good in compression set.

2. Description of the Prior Art

Silicone rubber compositions are excellent in properties such as heat resistance, cold resistance, weather resistance, and electrical resistance properties and are used in various fields. In particular, fluorosilicone compositions having a 3,3,3-trifluoropropyl group in a side chain are excellent also in solvent resistance and are used widely, for example, for diaphragms, O-rings, and oil seals as parts of transporting apparatuses and parts of petroleum related apparatuses.

However, although conventional known fluorosilicone rubber compositions exhibit excellent solvent resistance to nonpolar solvents such as benzene, they have a problem that they easily swell in polar solvents such as ketones, esters, and alcohols and are poor in solvent resistance to polar solvents. In addition, they are considered to be further improved in fuel oil resistance.

As rubber materials excellent in solvent resistance, fluororubbers are known, but they are defective in that they are, for example, poor in compression set which is important as a property of sealing materials and poor in cold resistance.

SUMMARY OF THE INVENTION

Therefore, an object of the present invention is to provide a fluorosilicone rubber composition that exhibits excellent solvent resistance to any of nonpolar solvents, polar solvents, fuel oils; and the like and are excellent in compression set.

The present invention has succeeded in attaining the above object by using particularly an organopolysiloxane containing a perfluoroalkyl ether group having 4 or more carbon atoms.

According to the present invention, there is provided a fluorosilicone rubber composition comprising (A) 100 parts by weight of an organopolysiloxane represented by the following average composition formula (1):

$$R_a(CF_3CH_2CH_2)_b SiO_{\frac{4-(a+b)}{2}} \quad (1)$$

wherein R represents an unsubstituted monovalent hydrocarbon group and a and b are numbers that satisfy $b/(a+b)=0.4$ to $0.6$ and $a+b=1.95$ to $2.05$, (B) 5 to 50 parts by weight of an organopolysiloxane represented by the following general formula (2):

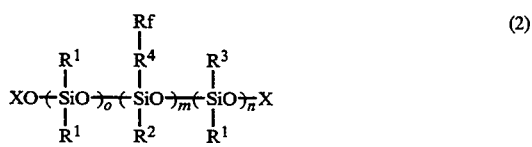

wherein $R^1$ and $R^2$, which may be the same or different, each represent an unsubstituted or substituted monovalent hydrocarbon group having no aliphatic unsaturated bond, $R^3$ represents a monovalent aliphatic unsaturated group, $R^4$ represents a bivalent hydrocarbon group containing no aliphatic unsaturated bond or a group represented by the following formula (3):

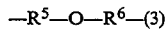

wherein $R^5$ and $R^6$ each represent a bivalent hydrocarbon group containing no aliphatic unsaturated bond, Rf represents a perfluoroalkyl ether group having 4 or more carbon atoms, X represents a hydrogen atom or a group represented by the following formula (4):

wherein $R^7$ to $R^9$, which may be the same or different, each represent an unsubstituted or substituted monovalent hydrocarbon group, o and n each represent an integer of 0 or greater, and m is an integer of 1 or greater, and (C) 5 to 500 parts by weight of a silica filler.

DETAILED DESCRIPTION OF THE INVENTION

Component (A)

The organopolysiloxane, the component (A), to be used in the present invention is represented by the above average composition formula (1).

Herein, the unsubstituted monovalent hydrocarbon group R includes, for example, an alkyl group such as a methyl group, an ethyl group, a propyl group, and a butyl group, an alkenyl group such as a vinyl group, an allyl group, and a butenyl group, a cycloalkyl group such as a cyclohexyl group, an aryl group such as a phenyl group, a tolyl group, and a naphthyl group, and an aralkyl group such as a benzyl group and a 2-phenylethyl group. R's may be the same or different.

It is required that the total content (a +b) of the trifluoropropyl group ($CF_3CH_2CH_2$—) and the above hydrocarbon group R is in the range of 1.95 to 2.05 and the content ratio [b/(a+b)] of the trifluoropropyl group is in the range of 0.4 to 0.6.

Although it is preferable that the molecular structure of the organopolysiloxane is straight-chain, the molecular structure may be branched partially. The degree of polymerization is preferably in the range of 500 to 20,000, in particular 1,000 to 10,000. If the degree of polymerization is too small, the mechanical strength of the cured product obtained from the present composition is inclined to lower whereas if the degree of polymerization is too large, in some cases, such a problem arises that the processability of the composition will lower.

Component (B)

In the present invention, as the component (B), the perfluoroalkyl ether group-containing organopolysiloxane represented by the above general formula (2) is used. The use of such a component improves remarkably the solvent resistance, for example, to any nonpolar solvents, polar solvents, and fuel oils, as well as ameliorating the compression set.

Preferably, that perfluoroalkyl ether group-containing organopolysiloxane is used in an amount of 5 to 50 parts by weight, particularly 20 to 40 parts by weight, per 100 parts by weight of the component (A), the organopolysiloxane. If the amount of the perfluoroalkyl ether group-containing organopolysiloxane is less than 5 parts by weight, the intended polar solvent resistance is not improved whereas if the amount is over 50 parts by weight, the tensile strength and compression set will be disadvantageously aggravated.

In the above-mentioned general formula (2), the monovalent hydrocarbon groups $R^1$ and $R^2$ each represent a group having no aliphatic unsaturated bond, preferably one having 8 or less carbon atoms, and specific examples include an alkyl group such as a methyl group, an ethyl group, an isopropyl group, and a butyl group, a cycloalkyl group such as a cyclohexyl group and a cyclopentyl group, an aryl group such as a phenyl group, a tolyl group, and a xylyl group, an aralkyl group such as a benzyl group and a phenylethyl group, a halogenated hydrocarbon group such as a chloromethyl group, a chloropropyl group, a chlorohexyl group, and a 3,3,3-trifluoropropyl group, and a cyanohydrocarbon group such as a 2-cyanoethyl group. In the present invention, particularly preferable groups are the methyl group, the ethyl group, the phenyl group, and the 3,3,3-trifluoropropyl group.

Examples of the monovalent aliphatic unsaturated group $R^3$ include a vinyl group, an allyl group, and an ethynyl group, particularly preferably the vinyl group.

The group $R^4$ is a bivalent organic group present between the fluorine-containing group Rf and the silicon atom, which is a bivalent hydrocarbon group containing no aliphatic unsaturated bond or a bivalent organic group represented by the above formula (3):

$$-R^5-O-R^6 \tag{3}$$

wherein $R^5$ and $R^a$ each represent a bivalent hydrocarbon group containing no aliphatic unsaturated bond. Specific examples are groups represented by the following formulas:

$-CH_2-$, $-CH_2CH_2-$, $-CH_2CH_2CH_2-$,

$-(CH_2)_6-$, $-(CH(CH_3)CH_2)_2-$, 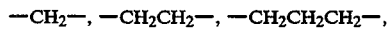

$CH_2-O-CH_2-$, $-CH_2-O-CH_2CH_2CH_2-$, and

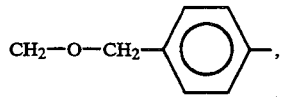

with particular preference given to $-CH_2CH_2-$, $-CH_2CH_2CH_2-$, and $-CH_2CH_2CH_2-O-CH_2-$.

The fluorine-containing organic group Rf is a perfluoroalkyl ether group having 4 or more carbon atoms, a preferable example is a perfluoroalkyl ether group having 5 to 15 carbon atoms, and particularly preferable examples include groups represented by the following formulas:

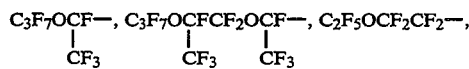

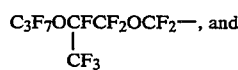

The group X represents a hydrogen atom or a group represented by the above general formula (4):

wherein $R^7$ to $R^9$, which may be the same or different, each represent an unsubstituted or substituted monovalent hydrocarbon group. Examples of $R^7$ to $R^9$ include those monovalent hydrocarbon groups having no aliphatic unsaturated group shown by way of example for the above described $R^1$ and an alkenyl group such as a vinyl group, an allyl group, and a butenyl group. In the present invention, preferably the group X is a hydrogen atom, a trimethylsilyl, or a vinyldimethylsilyl group.

In the above general formula (2), 0 is an integer of 0 or greater, m is an integer of 1 or greater, preferably an integer of 50 to 5,000, and n is an integer of 0 or greater. In the present invention, particularly, o, m, and n are such that the value of $m/(o+m+n)$ is in the range of 1/20 to 1/1.

Further, it is desirable that the above-described perfluoroalkyl ether group-containing organopolysiloxanes have a viscosity in the range of 100 to 1,000,000 cSt at 25° C. and may be used singly or as a mixture of two or more.

The above-described perfluoroalkyl ether group-containing organopolysiloxanes can be prepared in the manner known per se.

For example, if $R^1$ to $R^9$ and Rf have the meanings as defined above, this organopolysiloxane can be prepared by copolymerizing a cyclotrisiloxane represented by the following general formula (5):

a cyclotrisiloxane represented by the following general formula (6):

and a cyclotrisiloxane represented by the following general formula (7)

in the presence of an alkali or acid catalyst. In this case, the obtained organopolysiloxane is represented by the above general formula (2) wherein X represents a hydrogen atom, namely, the organopolysiloxane having a silanol group (—SiOH) at the end of the molecule.

Further, the organopolysiloxane the end of the molecule of which is blocked with the group represented by the general formula (4) can be prepared by carrying out the above copolymerization in the presence of a linear siloxane represented by the following formula (8) or (9):

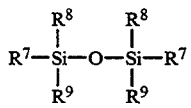

(8)

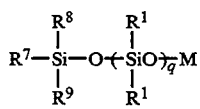

(9)

wherein q is an integer of 0 or greater and M represents an alkali metal atom.

In the above copolymerization, as the alkali or acid catalyst to be used, for example, an alkali hydroxide such as lithium hydroxide, sodium hydroxide, and potassium hydroxide, an alkali siliconate such as lithium siliconate, sodium siliconate, and potassium siliconate, a quaternary salt hydroxide such as tetrabutylphosphine hydroxide and tetramethyl hydroxide, a five-coordinate silicon compound represented by the following formula:

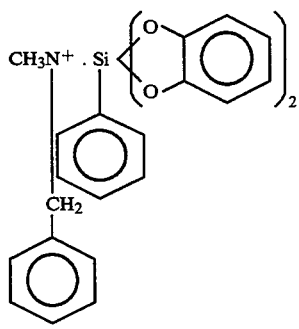

sulfuric acid, or trifluoromethanesulfonic acid is preferably used.

Component (C)

In the present invention, the silica filler used as the component (C) is added, for example, in order to reinforce the silicone rubber, to increase the viscosity of the silicone rubber, to improve the processability of the silicone rubber, and to extend the silicone rubber, and specific examples include fumed silica, precipitated silica, fumed silica and precipitated silica whose surfaces have been treated to be made hydrophobic, quartz powder, and diatomaceous earth. In the present invention, particularly those having a specific surface area of 1 m²/g or over are used.

These silica fillers are used singly or as a mixture of two or more generally in an amount of 5 to 500 parts by weight, particularly 10 to 300 parts by weight, per 100 parts by weight of the organopolysiloxane, the component (A). If the amount is less than 5 parts by weight, the intended reinforcing properties become unsatisfactory and the processability becomes inadequate whereas if the amount is over 500 parts by weight, in some cases, the processability such as the mold flow properties and the extrudability lowers extremely.

Other ingredients

The present fluorosilicone composition can be cured by using a curing catalyst and as that curing catalyst an organic peroxide is desirably added. As the organic peroxide, those generally used in curing silicone rubber compositions by heating can be used, and examples include benzoyl peroxide, monochlorobenzoyl peroxide, 2,4-dichlorobenzoyl peroxide, t-butyl perbenzoate, dicumyl peroxide, 2,5-bis(t-butyl-peroxy)-2,5-dimethylhexane, and 2,5-bis(t-butyl-peroxy)-2,5-dimethylhexane, which may be used singly or as a mixture of two or more.

It is generally preferable that the amount of these organic peroxides to be added is 0.1 to 5 parts by weight per 100 parts by weight of the organopolysiloxane, the component (A).

If necessary, to the present fluorosilicone rubber composition may be added a dispersing agent such as a low-molecular siloxane having a degree of polymerization of 100 or below, a silanol group-containing silane, and an alkoxy group-containing silane; a heat resistance improver such as iron oxide, cerium oxide, iron octylate, and titanium oxide; a pigment and a dye for coloring; a fire retardancy improver such as a platinum compound; and other additives that will generally be added to silicone rubber compositions suitably in the ranges where the objects of the present invention are not damaged.

The fluorosilicone rubber composition

The present fluorosilicone rubber composition can be readily prepared by mixing uniformly the components described above. This rubber composition can be molded into a product having a desired shape such as pipes, sheets, profiled products, electric wires in accordance with the usual rubber molding process such as compression molding, extrusion molding, calendering, transfer molding, and injection molding, which can be cured in a usual manner to effect the crosslinking to obtain a silicone rubber molded item.

EXAMPLES

In the following Examples, "parts" denotes "parts by weight."

Example 1 and Comparative Examples 1 and 2

As the component (A) which is an organpolysiloxane, an organopolysiloxane represented by the following average molecular formula:

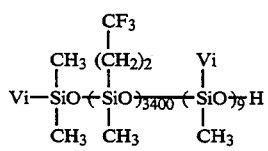

wherein Vi represents a vinyl group, which will be applied hereinafter, was used.

As the component (B) which is an organopolysiloxane, an organopolysiloxane represented by the following average molecular formula:

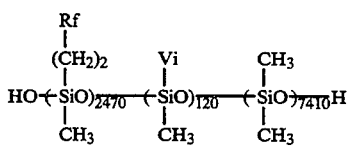

wherein Rf represents a perfluoroalkyl ether group represented by the following formula:

was used.

100 parts of the above organopolysiloxanes (A) plus (B) in the ratios shown in Table 1, 38 parts of fumed silica (available under the trade name of Aerozil 200 manufactured by Nippon Aerozil (KK)), 2 parts of diphenylsilanediol, and 8 parts of a 3,3,3-trifluoropolysiloxane having hydroxyl groups at both ends (degree of polymerization: 20) were mixed in a kneader and heat-treated at 150° C. for 4 hours.

100 parts of each of the thus obtained above mixtures, 0.8 part of cerium dioxide, 2 parts of a dimethylpolysiloxane containing 3 mol % of a vinylmethylsiloxy unit, and 0.5 part of 2,5-bis(butylperoxy)-2,5-dimethylhexane were mixed uniformly using a two-roll, thereby obtaining three compositions.

(Example 1 falls in the present invention, Comparative Example 1 is an example where the organopolysiloxane (B) was not used, and Comparative Example 2 is an example where the blended amount of the organopolysiloxane (B) falls outside the range of the present invention.)

Then, using these compositions, test sheets were prepared by molding them under pressure for 10 min at 165° C.

Using these test sheets, the mechanical properties and solvent resistance were measured in accordance with JIS K-6301. The results are shown in Table 1.

TABLE 1

|  | Comparative Example 1 | Example 1 | Comparative Example 2 |
|---|---|---|---|
| Polyorganosiloxanes (A)/(B) | 100/0 | 75/25 | 50/50 |
| Hardness (*) | 70 | 72 | 72 |
| Elongation (%) | 320 | 250 | 210 |
| Tensile strength (kgf/cm²) | 107 | 85 | 66 |
| Tear strength [A] (kgf/cm) | 27 | 20 | 16 |
| Compression set (%) [180° C./22 hr] | 4.1 | 3.6 | 4.7 |
| Solvent resistance [volume change] (%) |  |  |  |
| JIS No. 3 oil [150° C./70 hr] | +2.6 | +1.4 | +1.6 |
| Fuel C [25° C./70 hr] | +12.9 | +14.1 | +14.9 |
| Fuel C/MeOH = 80/20 (in volume) [25° C./70 hr] | +15.7 | +14.3 | +15.7 |
| MeOH [25° C./70 hr] | +3.2 | +1.3 | +0.8 |
| Toluene [25° C./70 hr] | +14.1 | +13.1 | +12.1 |
| Acetone [25° C./70 hr] | +167 | +120 | +71 |
| Ethyl acetate [25° C./70 hr] | +167 | +122 | +82 |
| Carbon tetrachloride [25° C./70 hr] | +18 | +23 | +27 |

Note:
the hardness was measured by using a JIS A-type hardness spring tester.

From the results as shown in Table 1, he composition of Comparative Example 1 is defective in that the swell in such polar solvents as acetone and ethyl acetate becomes large. The composition of Comparative Example 2 is defective in that the tensile strength and compression set properties are lower. In contrast, it can be understood that, in Example 1, the solvent resistance to both nonpolar solvents and polar solvents is improved and the tensile strength and the compression set are excellent With respect to the compositions of Example 1 and Comparative Example 1, the compression set in a fuel oil was measured and the results are shown in Table 2. The test followed JIS K-6301, and test specimens secured to a compression apparatus were immersed in a fuel oil (a Nisseki regular gasoline containing 2.5 % by weight of lauroyl peroxide and 5 % by weight of water) for 70 hours at 100° C., and then were heated at 100° C for 24 hours in the air. That constituted one cycle, and ten such cycles were repeated, during which the compression set was measured. From the results shown in Table 2, it can be understood that the composition of Example 1 is excellent in compression set properties in the fuel oil.

TABLE 2

| Compression set (%) | Comparative Example 1 | Example 1 |
|---|---|---|
| 1 cycle | 20 | 12 |
| 5 cycles | 56 | 32 |
| 10 cycles | 75 | 43 |

We claim:
1. A fluorosilicone rubber composition comprising
(A) 100 parts by weight of an organopolysiloxane represented by the following average composition formula (1):

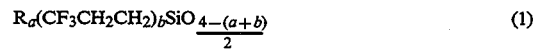

wherein R represents an unsubstituted monovalent hydrocarbon group and a and b are numbers that satisfy $b/(a+b)=0.4$ to 0.6 and $a+b=1.95$ to 2.05,
(B) 5 to 50 parts by weight of an organopolysiloxane represented by the following general formula (2):

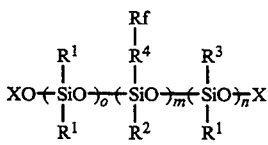

wherein $R^1$ and $R^2$, which may be the same or different, each represent an unsubstituted or substituted monovalent hydrocarbon group having no aliphatic unsaturated bond, $R^3$ represents a monovalent aliphatic unsaturated group, $R^4$ represents a bivalent hydrocarbon group containing no aliphatic unsaturated bond or a group represented by the following formula (3):

$$-R^5-O-R^6- \qquad (3)$$

wherein $R^5$ and $R^6$ each represent a bivalent hydrocarbon group containing no aliphatic unsaturated bond, Rf represents a perfluoroalkyl ether group having 4 or more carbon atoms, X represents a hydrogen atom or a group represented by the following formula (4):

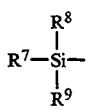

wherein $R^7$ to $R^9$, which may be the same or different, each represent an unsubstituted or substituted monovalent hydrocarbon group, o and n each represent an integer of 0 or greater, and m is an integer of 1 or greater, and (C) 5 to 500 parts by weight of a silica filler.

2. A composition as claimed in claim 1, wherein the degree of polymerization of organopolysiloxane component (A) is in the range of 500 to 20,000.

3. A composition as claimed in claim 1, wherein the degree of polymerization of organopolysiloxane component (A) is in the range of 1,000 to 10,000.

4. A composition as claimed in claim 1, wherein, in the general formula (2) representing the organopolysiloxane which is the component (B), o, m, and n satisfy $$1/20 \leq m/(o+m+n) \leq 1/1.$$

5. A composition as claimed in claim 1, wherein, in the general formula (2) representing the organopolysiloxane which is the component (B), $R^1$ and $R^2$ each represent a methyl group, an ethyl group, a phenyl group, or a 3,3,3-trifluoropropyl group.

6. A composition as claimed in claim 1, wherein, in the general formula (2) representing the organopolysiloxane which is the component (B), $R^3$ represents a vinyl group.

7. A composition as claimed in claim 1, wherein, in the general formula (2) representing the organopolysiloxane which is the component (B), $R^4$ represents $-CH_2CH_2-$, $-CH_2CH_2CH_2-$, or $-CH_2CH_2CH_2-O-CH_2-$.

8. A composition as claimed in claim 1, wherein, in the general formula (2) representing the organopolysiloxane which is the component (B), Rf represents a perfluoroalkyl ether group having 5 to 15 carbon atoms.

9. A composition as claimed in claim 1, wherein, in the general formula (2) representing the organopolysiloxane which is the component (B), Rf represents

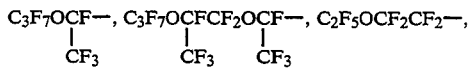

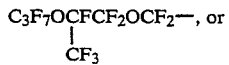

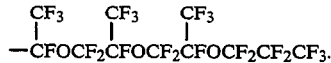

10. A composition as claimed in claim 1, wherein an organic peroxide is blended

11. A composition as claimed in claim 10, wherein said organic peroxide is blended in an amount of 0.1 to 5 parts by weight per 100 parts by weight of the component (A).

12. A cured product obtained by curing the component as claimed in claim 1.

* * * * *